United States Patent
Nir et al.

(10) Patent No.: US 11,954,893 B2
(45) Date of Patent: *Apr. 9, 2024

(54) NEGATIVE SAMPLING ALGORITHM FOR ENHANCED IMAGE CLASSIFICATION

(71) Applicant: Microsoft Technology Licensing, LLC, Redmond, WA (US)

(72) Inventors: Oron Nir, Hertzeliya (IL); Maria Zontak, Seattle, WA (US); Tucker Cunningham Burns, Issaquah, WA (US); Apar Singhal, Seattle, WA (US); Lei Zhang, Bellevue, WA (US); Irit Ofer, Kfar-Saba (IL); Avner Levi, Kiryat Ono (IL); Haim Sabo, Petah Tikva (IL); Ika Bar-Menachem, Herzliya (IL); Eylon Ami, Givataayim (IL); Ella Ben Tov, Tel-Aviv (IL); Anika Zaman, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/843,270

(22) Filed: Jun. 17, 2022

(65) Prior Publication Data
US 2022/0318574 A1    Oct. 6, 2022

Related U.S. Application Data

(63) Continuation of application No. 16/831,105, filed on Mar. 26, 2020, now Pat. No. 11,366,989.
(Continued)

(51) Int. Cl.
*G06V 10/00* (2022.01)
*G06F 18/214* (2023.01)
(Continued)

(52) U.S. Cl.
CPC .......... *G06V 10/25* (2022.01); *G06F 18/2155* (2023.01); *G06F 18/24* (2023.01);
(Continued)

(58) Field of Classification Search
CPC .... G06K 9/6267; G06K 9/344; G06K 9/4628; G06K 9/2013; G06K 9/00718;
(Continued)

(56) References Cited

U.S. PATENT DOCUMENTS 5,594,767 A * 1/1997 Hsieh .................... A61B 6/5258
378/8
5,745,601 A * 4/1998 Lee ......................... G06V 20/69
382/228

(Continued)

OTHER PUBLICATIONS

"Non Final Office Action Issued in U.S. Appl. No. 17/590,275", dated Nov. 15, 2022, 7 Pages.
(Continued)

*Primary Examiner* — Amir Alavi

(57) ABSTRACT

The technology described herein is directed to systems, methods, and software for indexing video. In an implementation, a method comprises identifying one or more regions of interest around target content in a frame of the video. Further, the method includes identifying, in a portion of the frame outside a region of interest, potentially empty regions adjacent to the region of interest. The method continues with identifying at least one empty region of the potentially empty regions that satisfies one or more criteria and classifying at least the one empty region as a negative sample of the target content. In some implementations, the negative sample of the target content in a set of negative samples of the target content, with which to train a machine learning model employed to identify instances of the target content.

20 Claims, 17 Drawing Sheets

Related U.S. Application Data

(60) Provisional application No. 62/889,314, filed on Aug. 20, 2019.

(51) Int. Cl.
  *G06F 18/24* (2023.01)
  *G06V 10/25* (2022.01)
  *G06V 10/774* (2022.01)
  *G06V 20/40* (2022.01)

(52) U.S. Cl.
  CPC ............ *G06V 10/774* (2022.01); *G06V 20/41* (2022.01); *G06V 20/46* (2022.01)

(58) Field of Classification Search
  CPC .... G06K 9/6259; G06V 10/25; G06V 10/774; G06V 10/41; G06V 10/82; G06V 10/454; G06V 20/41; G06V 20/00; G06F 18/24; G06F 18/2155; G06T 7/0081; G06T 7/0083; G06T 5/40; G06T 2207/20144; G06T 2207/10016; G06T 2207/30176; G06T 2207/20148; H04N 1/403
  See application file for complete search history.

(56) References Cited

U.S. PATENT DOCUMENTS

| | | | |
|---|---|---|---|
| 6,441,825 B1 | 8/2002 | Peters | |
| 6,587,574 B1 | 7/2003 | Jeannin | |
| 6,602,297 B1 | 8/2003 | Song | |
| 8,059,892 B1 * | 11/2011 | Fan | G06T 7/11 382/167 |
| 8,340,405 B2 * | 12/2012 | Cooper | G06V 20/10 382/190 |
| 10,043,078 B2 | 8/2018 | Winter et al. | |
| 10,068,171 B2 * | 9/2018 | Wshah | G06V 10/806 |
| 10,255,525 B1 * | 4/2019 | Totolos, Jr. | B60W 10/20 |
| 10,432,896 B2 | 10/2019 | Winter et al. | |
| 10,977,558 B2 * | 4/2021 | Herbster | G06T 3/4046 |
| 11,037,312 B2 * | 6/2021 | Gonzalez Aguirre | G06T 5/20 |
| 11,270,121 B2 * | 3/2022 | Nir | G06V 20/41 |
| 11,366,989 B2 * | 6/2022 | Nir | G06F 18/24 |
| 11,450,107 B1 | 9/2022 | Hoffman et al. | |
| 11,461,599 B2 * | 10/2022 | Ordonez | G06T 7/60 |
| 2017/0270180 A1 | 9/2017 | State | |
| 2018/0276696 A1 | 9/2018 | Kato | |
| 2020/0226416 A1 | 7/2020 | Bapat et al. | |
| 2021/0200994 A1 | 7/2021 | Chen et al. | |
| 2022/0130104 A1 | 4/2022 | Serry et al. | |
| 2022/0157057 A1 | 5/2022 | Nir et al. | |
| 2022/0292284 A1 | 9/2022 | Hoffman et al. | |
| 2022/0385711 A1 * | 12/2022 | Willemsen | H04N 21/23418 |
| 2023/0112904 A1 | 4/2023 | Hoffman et al. | |

OTHER PUBLICATIONS

"Notice of Allowance Issued in U.S. Appl. No. 17/197,478", dated May 11, 2022, 10 Pages.

"Notice of Allowance Issued in U.S. Appl. No. 17/590,275", dated May 31, 2023, 8 Pages.

"Notice of Allowance Issued in U.S. Appl. No. 17/590,275", dated Mar. 10, 2023, 8 Pages.

"Office Action Issued in European Patent Application No. 20735819.3", dated Jul. 13, 2023, 7 Pages.

Girshick, et al., "Rich feature Hierarchies for Accurate Object Detection and Semantic Segmentation Tech Report (v5)", In Repository of arXiv:1311.2524v5, Oct. 22, 2014, pp. 1-21.

"BFB 6 Except with an Object Detection Neural Network", Retrieved From: https://www.youtube.com/watch?v=x0GrFthY9_M, Feb. 25, 2019, 2 Pages.

"Non Final Office Action Issued in U.S. Appl. No. 17/896,666", dated Sep. 28, 2023, 14 Pages.

Notice of Allowance dated Feb. 15, 2024, in U.S. Appl. No. 17/896,666, 8 pages.

* cited by examiner

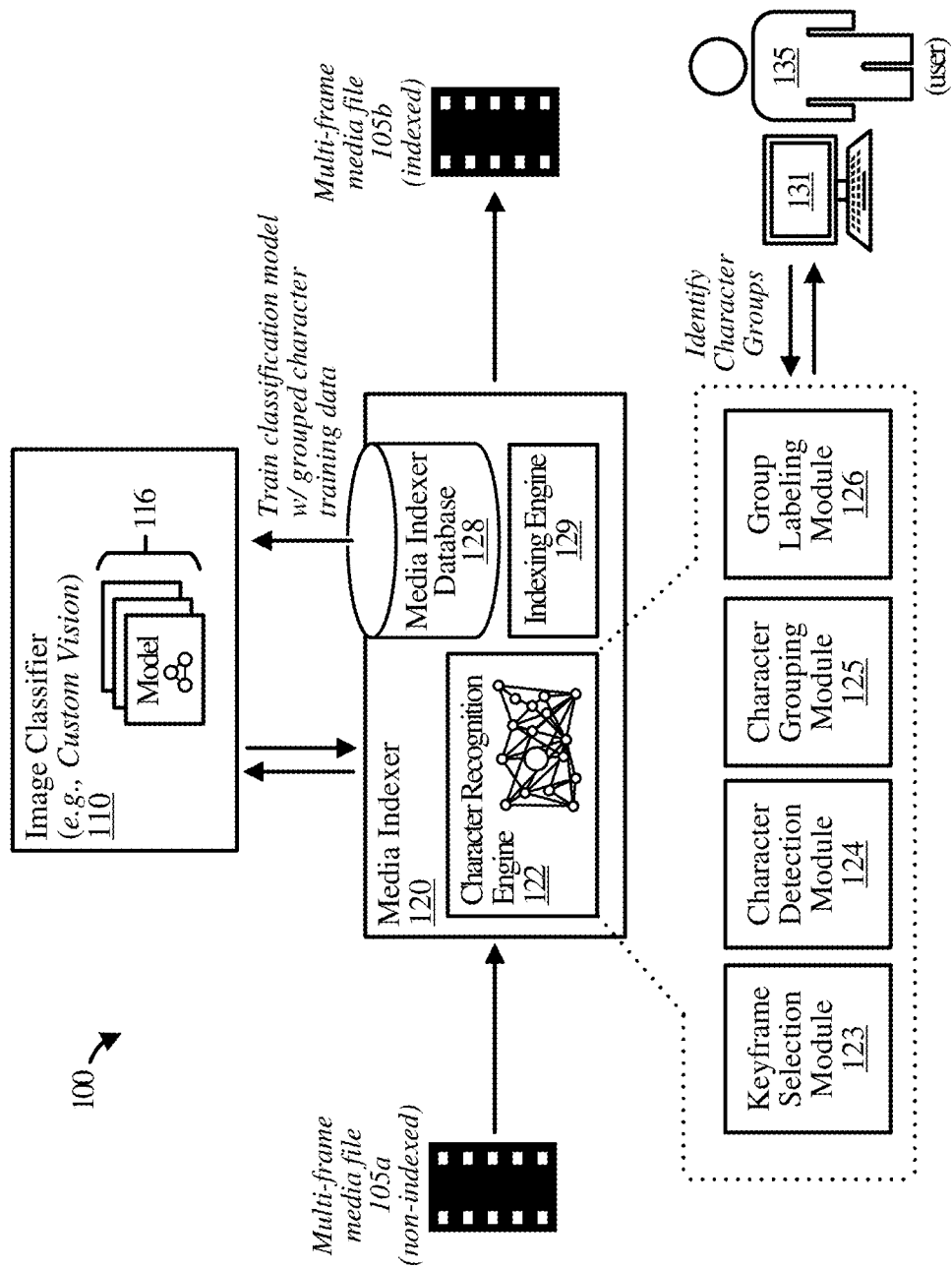

NEGATIVE SAMPLING ALGORITHM FOR ENHANCED IMAGE CLASSIFICATION

CROSS-REFERENCE TO RELATED APPLICATIONS

This application claims priority to and benefit from U.S. patent application Ser. No. 16/831,105 titled "NEGATIVE SAMPLING ALGORITHM FOR ENHANCED IMAGE CLASSIFICATION" filed on Mar. 26, 2020 and U.S. Provisional Patent Application Ser. No. 62/889,314 titled "QUAD TREE BASED NEGATIVE SAMPLING ALGORITHM FOR ENHANCED IMAGE CLASSIFICATION USING OBJECT DETECTION" filed on Aug. 20, 2019, the contents of which are expressly incorporated by reference in their entirety for all purposes herein.

TECHNICAL FIELD

Aspects of the disclosure are related to the field of machine learning and artificial intelligence, and in particular, to automated recognition and grouping of characters in multi-frame media files, e.g., animated videos, for semi-supervised training of machine learning image classification models.

BACKGROUND

Animation is an extremely large business worldwide and a major offering of many of the largest media companies. However, animated videos typically contain very limited meta-data and, therefore, efficient search and retrieval of specific content is not always possible. For example, a key component in animated media is the animated characters themselves. Indeed, characters in the animated videos must first be indexed, e.g., detected, classified, and annotated, in order to enable efficient search and retrieval of those characters within the animated video.

Various services can leverage artificial intelligence or machine learning for image understanding. However, these services typically rely on extensive manual labeling. For example, character recognition in an animated video currently involves manually drawing bounding boxes around each character and tagging (or labeling) the character contained therein, e.g., with the name of the character. This manual annotation process is repeated for each character of every frame of a multi-frame animated video. Unfortunately, this manual annotation process is tedious and severely limits scalability of these services.

Overall, the examples herein of some prior or related systems and their associated limitations are intended to be illustrative and not exclusive. Upon reading the following, other limitations of existing or prior systems will become apparent to those of skill in the art.

BRIEF SUMMARY

One or more embodiments described herein, among other benefits, solve one or more of the foregoing or other problems in the art by providing systems, methods, and non-transitory computer readable media that can automatically detect and group instances (or occurrences) of characters in a multi-frame animated media file such that each group contains images associated with a single character. The character groups themselves can then be labeled and used to train an image classification model for automatically classifying the animated characters in subsequent multi-frame animated media files.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter. Additional features and advantages of the present application will be set forth in the description which follows, and in part will be obvious from the description, or may be learned by the practice of such example embodiments.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIG. 1A depicts a block diagram illustrating an example animated character recognition and indexing framework for training an artificial intelligence-based (AI-based) image classification model to automatically classify characters in a multi-frame animated media file for indexing, according to some implementations.

Figure 1B:
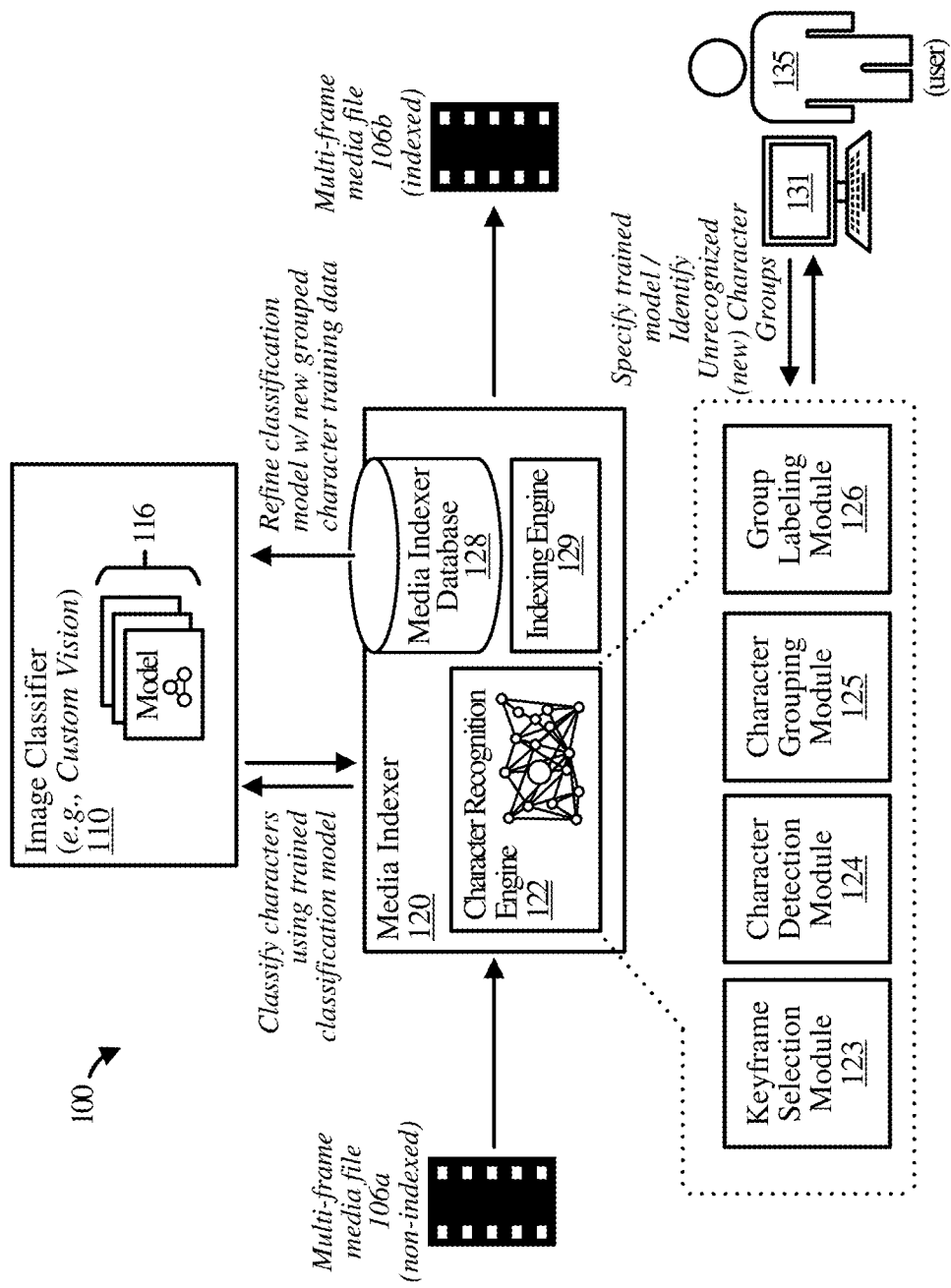
FIG. 1B depicts a block diagram illustrating the example animated character recognition and indexing framework applying (and re-training as necessary) the AI-based image classification model trained in the example of FIG. 1A, according to some implementations.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may include machine-implemented methods, computing devices, or computer readable medium.

Recognizing animated characters in video can be challenging for a number of reasons such as the unorthodox nature of animated characters themselves. Indeed, animated characters can come in many different forms, shapes, sizes, etc. In many cases, content producers, e.g., companies generating or manipulating animated media content, would like to index the characters included in their animated media content. However, as noted above, this is presently a very difficult and non-scalable process that requires manually annotating each character in every frame of a multi-frame animated media file.

The technology described herein is directed to a media indexer including a character recognition engine that can automatically detect and group instances (or occurrences) of characters in a multi-frame animated media file such that each group contains images associated with a single character. The character groups themselves are then labeled and the labeled groups are used to train an image classification model for automatically classifying the animated characters in subsequent multi-frame animated media files.

Various technical effects can be enabled by the techniques discussed herein. Among other benefits, the techniques discussed herein provide a scalable solution for training image classification models with minimal comprise to character detection or character classification accuracy. Additionally, the use of keyframes reduces the amount of data that needs to be processed while keeping the variance of data high. Furthermore, automated character recognition eliminates the need to manually annotate bounding boxes, and automated grouping of the characters yields accurate annotations with substantially reduced manual effort, e.g., semi-supervised training via group labeling as opposed to character-by-character annotation.

As used herein, the term "animated character" refers to an object that exhibits humanlike traits contained or detected in an animated multi-frame animated media file. For example, an "animated character" can be an animate or inanimate anthropomorphic object that exhibits any human form or attribute including, but not limited to, a human trait, emotion, intention, etc.

A general overview and example architecture of an animated character recognition and indexing framework is described for training an AI-based image classification model in relation to FIG. 1A. FIG. 1B then depicts an example whereby the animated character recognition and indexing framework applies (and re-trains or refines as necessary) the trained AI-based image classification model. Thereafter, a more detailed description of the components and processes of the animated character recognition and indexing framework are provided in relation to the subsequent figures.

FIG. 1A depicts a block diagram illustrating an example animated character recognition and indexing framework 100 for training an AI-based image classification model to automatically classify characters in a multi-frame animated media file for indexing, according to some implementations. Indeed, the example animated character recognition and indexing framework 100 includes a media indexer service 120 that can automatically detect and group instances (or occurrences) of characters in the media file such that each group contains images associated with a single character. The character groups are then identified (or recognized) and labeled accordingly. As shown in the example of FIG. 1A, the labeled character groups (or grouped character training data) can then be utilized to train the AI-based image classification model to automatically classify the animated characters in subsequent multi-frame animated media files.

As illustrated in the example of FIG. 1A, the animated character recognition and indexing framework 100 includes an image classifier 110, a media indexer 120 and a user 135 operating a computing system 131 that can provide user input to manually label (or recognize) the character groups. Additional or fewer systems or components are possible.

The image classifier 110 can be any image classifier of image classification service. In some implementations, the image classifier 110 can be embodied by an Azure Custom Vision Service provided by Microsoft. The Custom Vision Service uses a machine learning algorithm to apply labels to images. A developer typically submits groups of labeled images that feature and lack the characteristics in question. The machine learning algorithm uses the submitted data for training and calculates its own accuracy by testing itself on those same images. Once the machine learning algorithm (or model) is trained, the image classifier 110 can test, retrain, and use the model to classify new images.

As illustrated in the example of FIGS. 1A and 1B, the media indexer 120 includes a character recognition engine 122, a media indexer database 128, and an indexing engine 129.

The character recognition engine 122 includes a keyframe selection module 123, a character detection module 124, a character grouping module 125, and a group labeling module 126. The functions represented by the components, modules, managers and/or engines of character recognition engine 122 can be implemented individually or in any combination thereof, partially or wholly, in hardware, software, or a combination of hardware and software. Additionally, although illustrated as discrete components, the operation and functionality of the components, modules, managers and/or engines of the character recognition engine 122 can be, partially or wholly, integrated within other components of the animated character recognition and indexing framework 100.

In operation, a non-indexed (or unstructured) multi-frame animated media file 105a is fed to the media indexer 120 for character recognition and indexing. The media indexer 120 includes a character recognition engine 122, a media indexer database 128, and an indexing engine 129. Additional or fewer systems or components are possible.

The keyframe selection module 123 is configured to select or otherwise identify a small subset of the total frames of a multi-frame animated media file to reduce computational complexity of the character recognition process with minimal or limited effect on accuracy. Indeed, the keyframe selection module 123 is configured to identify and select important or significant frames (e.g., frames with the highest likelihood of observing characters) from the multi-frame animated media file. In some implementations, the keyframes are determined based at least in part, on their individual significance in determining a micro-scene or fraction of a shot. In some implementations, each frame can be assigned a significance value and frames having a significance value greater than a threshold value are selected as keyframes. Alternatively, or additionally, a percentage of the total frames, e.g., top one percent, of the frames with the highest rated significance value can be selected as keyframes.

As discussed herein, the keyframes typically constitute a small fraction, e.g., one percent of the total frames in the multi-frame animated media file, e.g., animated video. However, the performance difference between labeling each of the frames in the multi-frame animated media file versus labeling just the keyframes is nominal for the purposes of detecting each of the characters in the multi-frame animated media file. Thus, the keyframes allow the media indexer 130 to maintain character detection accuracy while simultaneously reducing computation complexity.

The character detection module 124 is configured to process or analyze the keyframes to detect (or propose) instances (or occurrences) of characters in the keyframes of the multi-frame animated media file. Indeed, the character detection module 124 can process the keyframes and provide character region proposals (also referred to as bounding boxes). For example, the character detection module 124 can capture each character region proposal as an image.

As discussed herein, detection of animated characters can be difficult as the characters can take the form of almost any animate (e.g., person, animal, etc.) or inanimate (e.g., robot, car, candle, etc.) object. Accordingly, in some implementations, the character detection module 124 includes an object detection model trained to detect bounding boxes of animated characters in different styles, themes, etc., (e.g., car, persons, robots, etc.).

In some implementations, the character detection module 124 can be trained to detect objects that exhibit humanlike traits. That is, the character detection module 124 is designed to detect any anthropomorphic object within the keyframes. As discussed herein, the term "anthropomorphic object" refers to any animate or inanimate object that exhibits any human form or attributes including, but not limited to, human traits, emotions, intentions, etc.

The character grouping module 125 is configured to compare and group the character region proposals based on similarity of the images such that each group contains images associated with a single character. In some instances, more than one of the resulting character groups can be associated with the same character, e.g., a first group including images of Sponge Bob with a hat and a second group including images of Sponge Bob without a hat.

In some implementations, the character grouping module 125 applies a clustering algorithm using embeddings of the detected character region proposals to determine the character groups. Indeed, the character groups can be determined by embedding the features of the character region proposals (or images) into a feature space to simplify the image comparisons. An example illustrating a method of applying a clustering algorithm including embedding the character region proposals (or images) into the feature space and comparing the embeddings to identify the character groups is shown and discussed in greater detail with reference to FIG. 5.

The group labeling module 126 is configured to label (annotate or classify) the character groups without the use of a classification model. As discussed herein, labeling the character groups is useful for initial training of a classification models as well as for refining trained classification models (as shown and discussed in greater detail with reference to FIG. 1B).

In some implementations, the group labeling module 126 can present each character group to the user 135 as a cluster of images. The character groups can then be classified with input from the user 135. For example, the user 135 can provide an annotation or tag for the group. Alternatively, or additionally, the user 115 can provide canonical images of the characters that are expected to appear in the multi-frame animated media file. In such instances, the canonical characters can be compared to the character groups to identify and label the character groups. In other implementations, the user 115 can provide a movie or series name of the multi-frame animated media file. In such instances, the group labeling module 126 can query a data store, e.g., Satori (Microsoft knowledge graph), for information about the movie and/or series and to extract names of the characters and any available canonical images.

FIG. 1B depicts a block diagram illustrating the example animated character recognition and indexing framework 100 applying (and re-training as necessary) the AI-based image classification model trained in the example of FIG. 1A, according to some implementations. Indeed, the trained AI-based image classification model is trained to automatically recognize and index animated characters in multi-frame animated media file 106a. The multi-frame animated media file 106a is related (e.g., of a same series or with one or more overlapping characters) to the multi-frame animated media file 105a.

As discussed herein, in some implementations, a user can specify a trained AI-based image classification model to use for indexing a multi-frame animated media file. An example illustrating a graphical user interface including various menus for selecting the trained AI-based image classification model is shown and discussed in greater detail with reference to FIG. 6.

In operation, the media indexer 120 can utilize the trained AI-based image classification model to classify character groups and refine (or tune) the trained AI-based image classification model using new grouped character training data, e.g., new characters or existing characters with new or different looks or features. As discussed herein, the media indexer 120 interfaces with the image classifier 110 to utilize, train, and/or refine the AI-based image classification model(s) 116.

As discussed above, the image classifier 110 can be embodied by the Azure Custom Vision Service which can be applied per cluster (or character group). In some implementations, a smoothing operation can be applied to handle cases where a single character is split into two or more different clusters (or character groups), e.g., group including images of Sponge Bob with a hat and group including images of Sponge Bob without a hat. The smoothing operation is operable to consolidate the two or more different clusters (or character groups) and provide grouped character training data to refine the trained AI-based image classification model such that future classifications are classified as the same character.

Figure 2:
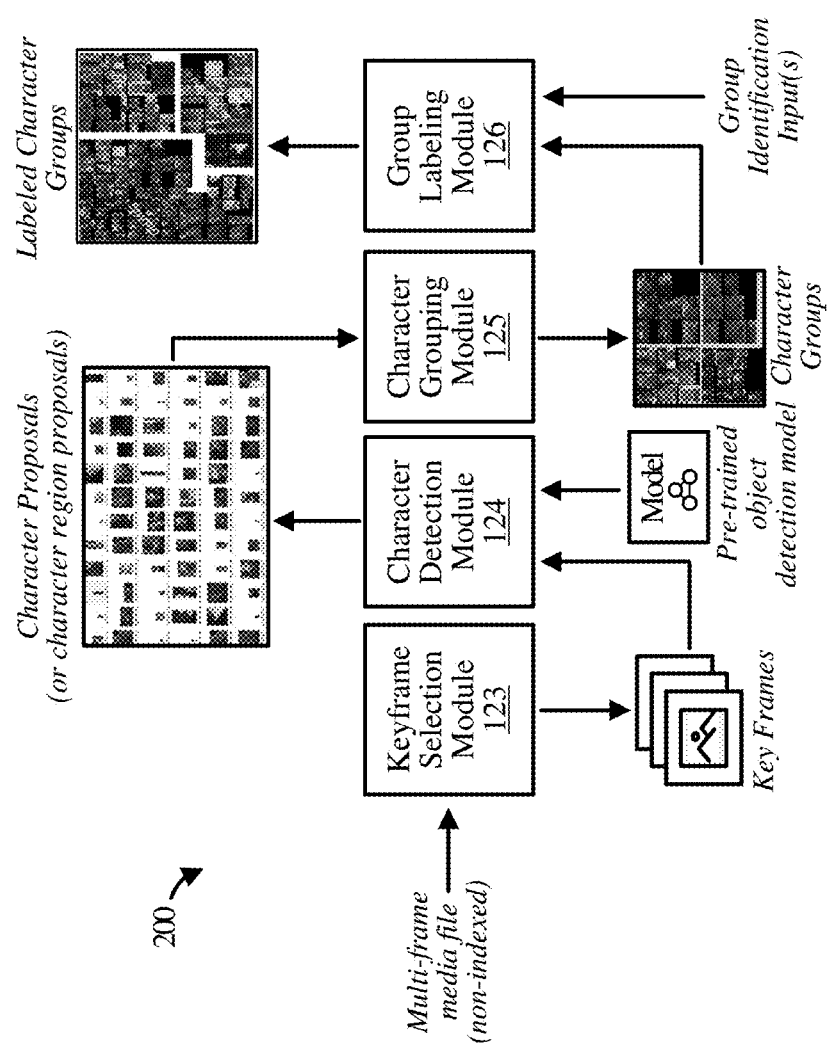
FIG. 2 depicts a data flow diagram that graphically illustrates operations and the flow of data between modules of a media indexer, according to some implementations.

FIG. 2 depicts a data flow diagram that graphically illustrates operations and the flow of data between modules of a media indexer 200, according to some implementations. As shown in the example of FIG. 2, the media indexer 200 includes the keyframe selection module 123, the character detection module 124, the character grouping module 125, and the group labeling module 126 of FIGS. 1A and 1B. Additional or fewer modules, components or engines are possible.

Figure 3:
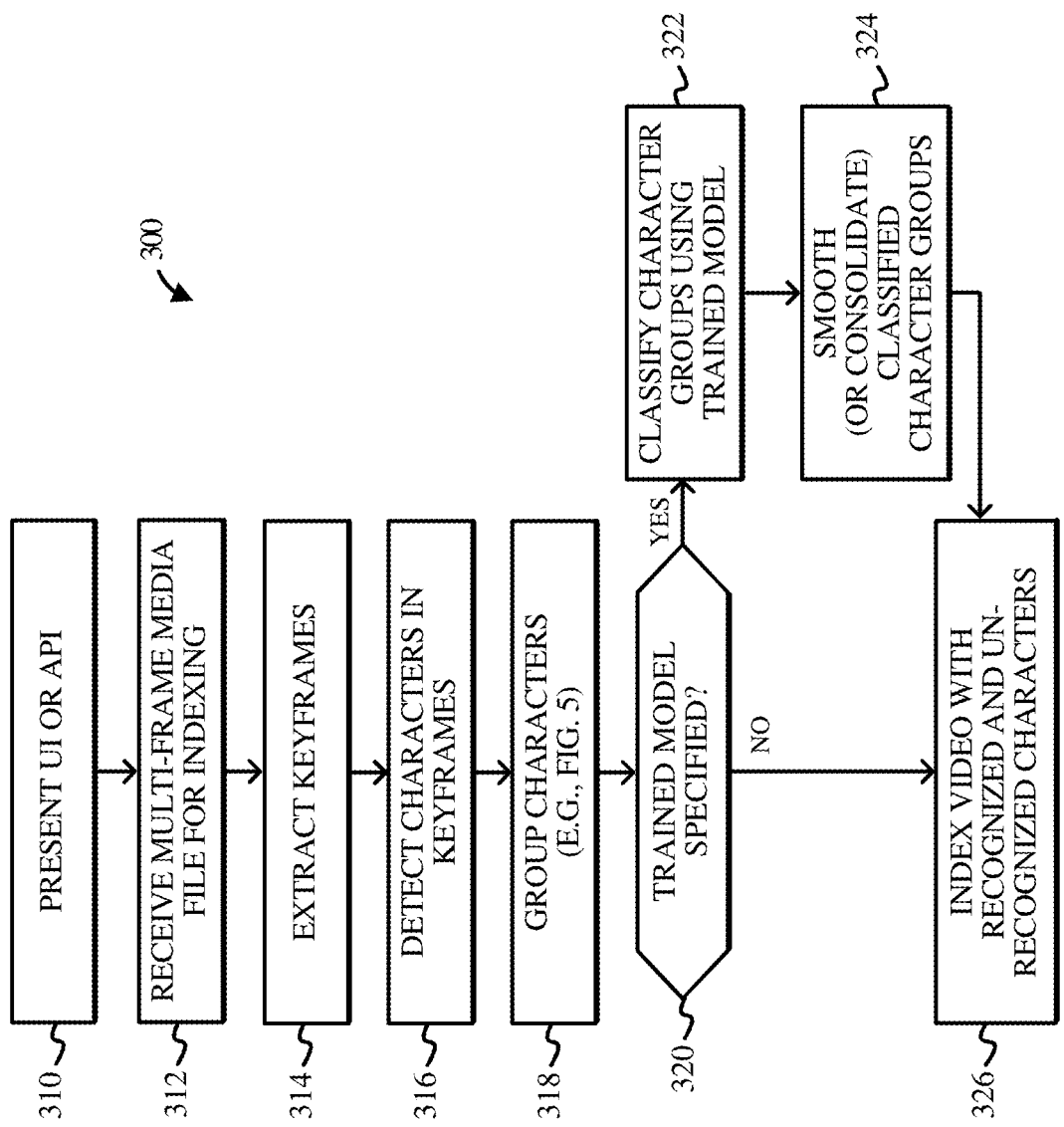
FIG. 3 depicts a flow diagram illustrating an example process for indexing a multi-frame animated media file using the automated character detection and grouping technique discussed herein, according to some implementations.

FIG. 3 depicts a flow diagram illustrating an example process 300 for indexing a multi-frame animated media file, e.g., animated video, using the automated character detection and grouping technique discussed herein, according to some implementations. The example process 300 may be performed in various implementations by a media indexer such as, for example, media indexer 120 of FIGS. 1A and 1B, or one or more processors, modules, engines, or components associated therewith.

To begin, at 310, the media indexer presents a user interface (UI) or application program interface (API). As discussed herein, the user can specify both a multi-frame animated media file to be indexed and an AI-based image classification model with which to index (if trained) or with which to train (if untrained). An example illustrating a graphical user interface including various menus for selecting the trained AI-based image classification model is shown and discussed in greater detail with reference to FIG. 6.

At 312, the media indexer receives a multi-frame animated media file, e.g., animated video, for indexing. At 314, the media indexer extracts or identifies keyframes. At 316, the media indexer detects characters in the keyframes. At 318, the media indexer groups the characters that are automatically detected in a multi-frame animated media file. An example illustrating character grouping is shown and discussed in greater detail with reference to FIG. 5. At 320, the media indexer determines if a trained classification model is specified. If so, at 322, the media indexer classifies the character groups using the trained classification model and, at 324, smooths (or consolidates) the classified character groups.

Figure 8:
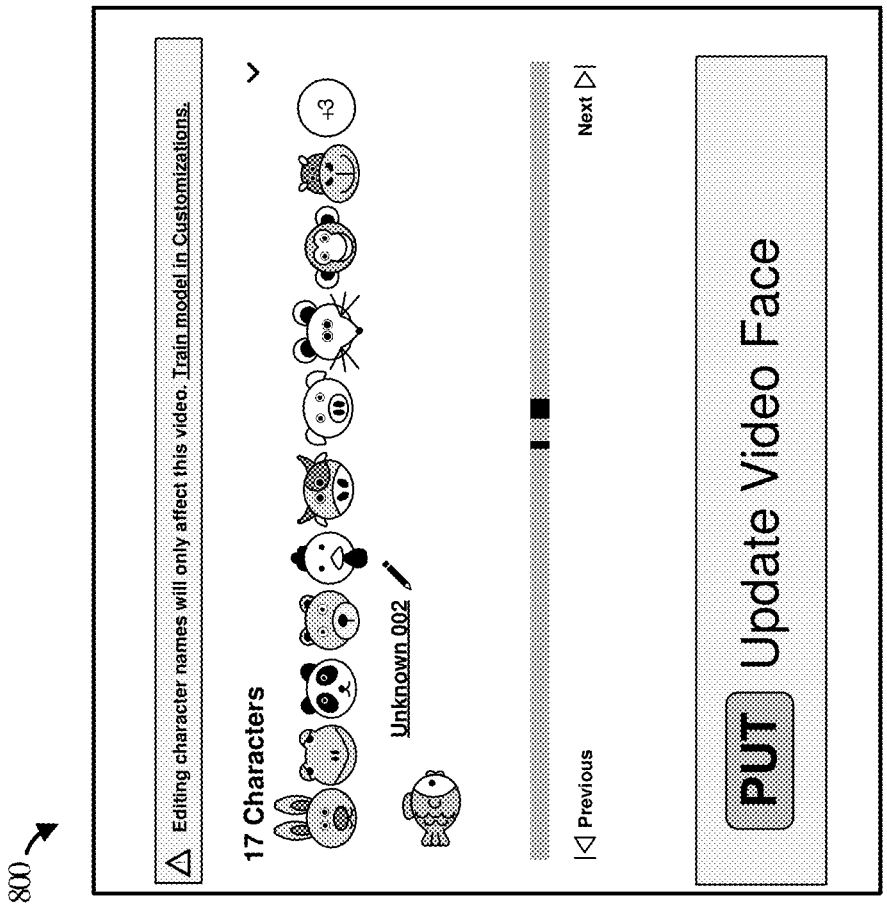
FIG. 8 depicts a graphical user interface illustrating an example video that has been indexed using the media indexer, according to some implementations.

Lastly, at 326, the multi-frame animated media file, e.g., animated video, is indexed with recognized (classified) and unrecognized (unknown) characters. An example graphical user interface illustrating an indexed multi-frame animated media file with both recognized and unrecognize characters is shown in the example of FIG. 8. As discussed herein, the user can specify or label the unrecognize character groups to refine the AI-based image classification model.

Figure 4:
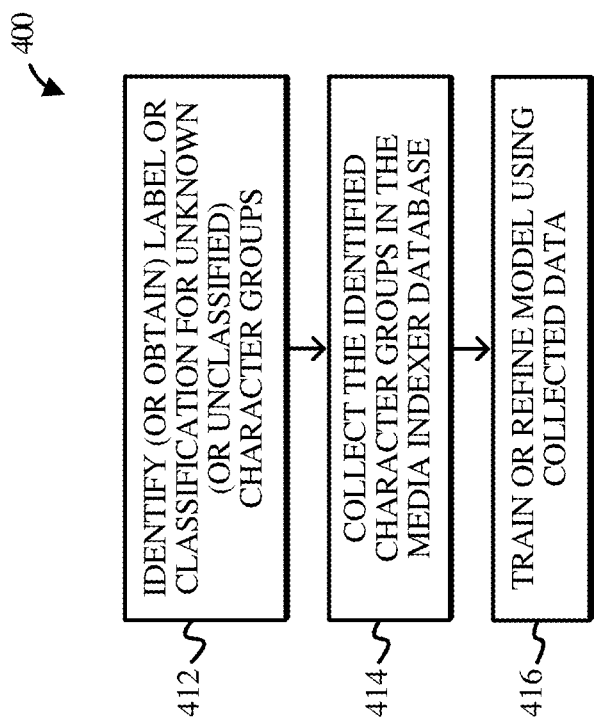
FIG. 4 depicts a flow diagram illustrating an example process for training or refining an AI-based image classification model using grouped character training data, according to some implementations.

FIG. 4 depicts a flow diagram illustrating an example process 400 for training or refining an AI-based image classification model using grouped character training data, according to some implementations. The example process 400 may be performed in various implementations by a media indexer such as, for example, media indexer 120 of FIGS. 1A and 1B, or one or more processors, modules, engines, or components associated therewith.

To begin, at 412, the media indexer identifies (or otherwise obtains) label or classification information At 414, the media indexer . . .

Lastly, at 416, the media indexer . . .

Figure 5:
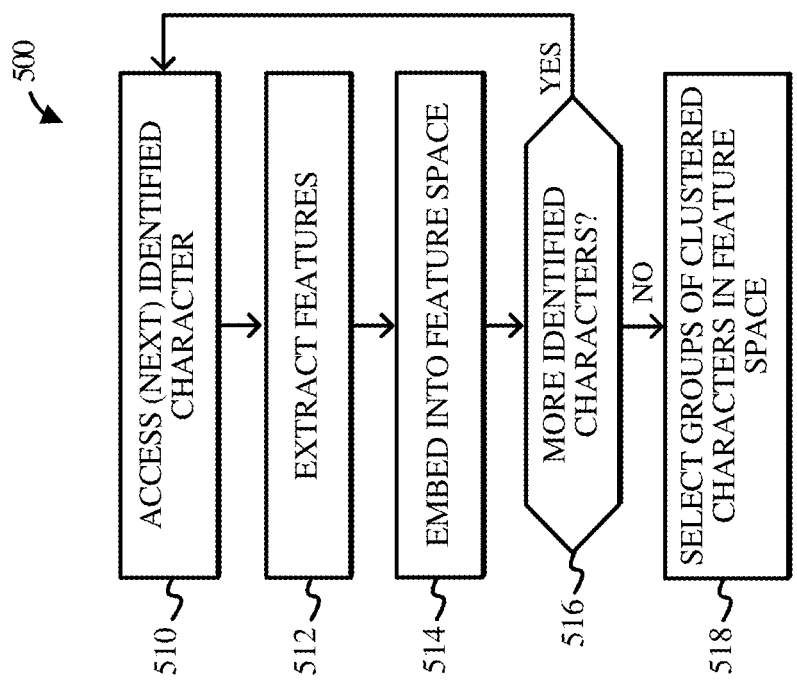
FIG. 5 depicts a flow diagram illustrating an example process for grouping (or clustering) characters that are automatically detected in a multi-frame animated media file, according to some implementations.

FIG. 5 depicts a flow diagram illustrating an example process 500 for grouping (or clustering) characters that are automatically detected in a multi-frame animated media file, according to some implementations. The example process 500 may be performed in various implementations by a media indexer such as, for example, media indexer 120 of FIGS. 1A and 1B, or one or more processors, modules, engines, or components associated therewith.

To begin, at 412, the media indexer identifies (or otherwise obtains) label or classification information for unknown (or unclassified) animated character groups. As discussed herein, the media indexer can identify label information, e.g., the name of the single animated character associated with each animated character group and classify (or annotate) the animated character groups with the identified label information resulting in at least one annotated animated character group At 414, the media indexer collects the identified (or annotated) animated character groups in a media indexer database. Lastly, at 416, the media indexer trains or refines an image classification model by feeding the annotated animated character groups to an image classifier to train an image classification model.

FIG. 5 depicts a flow diagram illustrating an example process 500 for grouping (or clustering) characters that are automatically detected in a multi-frame animated media file, according to some implementations. The example process 500 may be performed in various implementations by a media indexer such as, for example, media indexer 120 of FIGS. 1A and 1B, or one or more processors, modules, engines, or components associated therewith.

To begin, at 510, the media indexer accesses a next identified character. As discussed herein, each character region proposal comprises a bounding box or subset of a keyframe containing a proposed animated character. At 512, the media indexer extract features of the next identified character contained in the character region proposal and, at 514, embeds the features in a feature space.

At decision 516, the media indexer determines if more character region proposals have been identified and, if so, returns to step 510. As discussed herein, multiple keyframes from a multi-frame animated media file are first identified. Each of keyframes can include one or more character region proposals. Once each character region proposal is travers, at 518, the media indexer selects the groups of clusters character in the feature space. For example, the media indexer can determine a similarity between the character region proposals by comparing the embedded features within the feature space and apply a clustering algorithm to identify the animated character groups based on the determined similarity.

Figure 6:
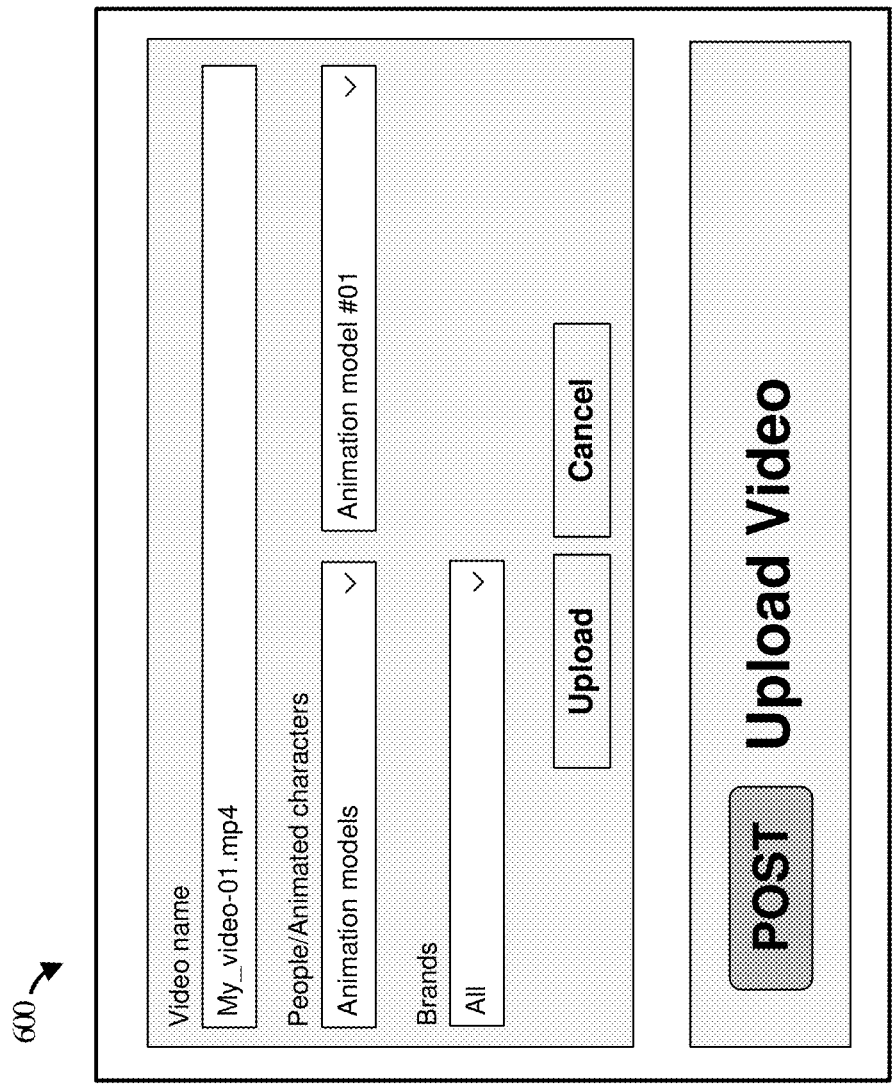
FIG. 6 depicts a graphical user interface including various menus for selecting various options for uploading a video file, according to some implementations.
Figure 7:
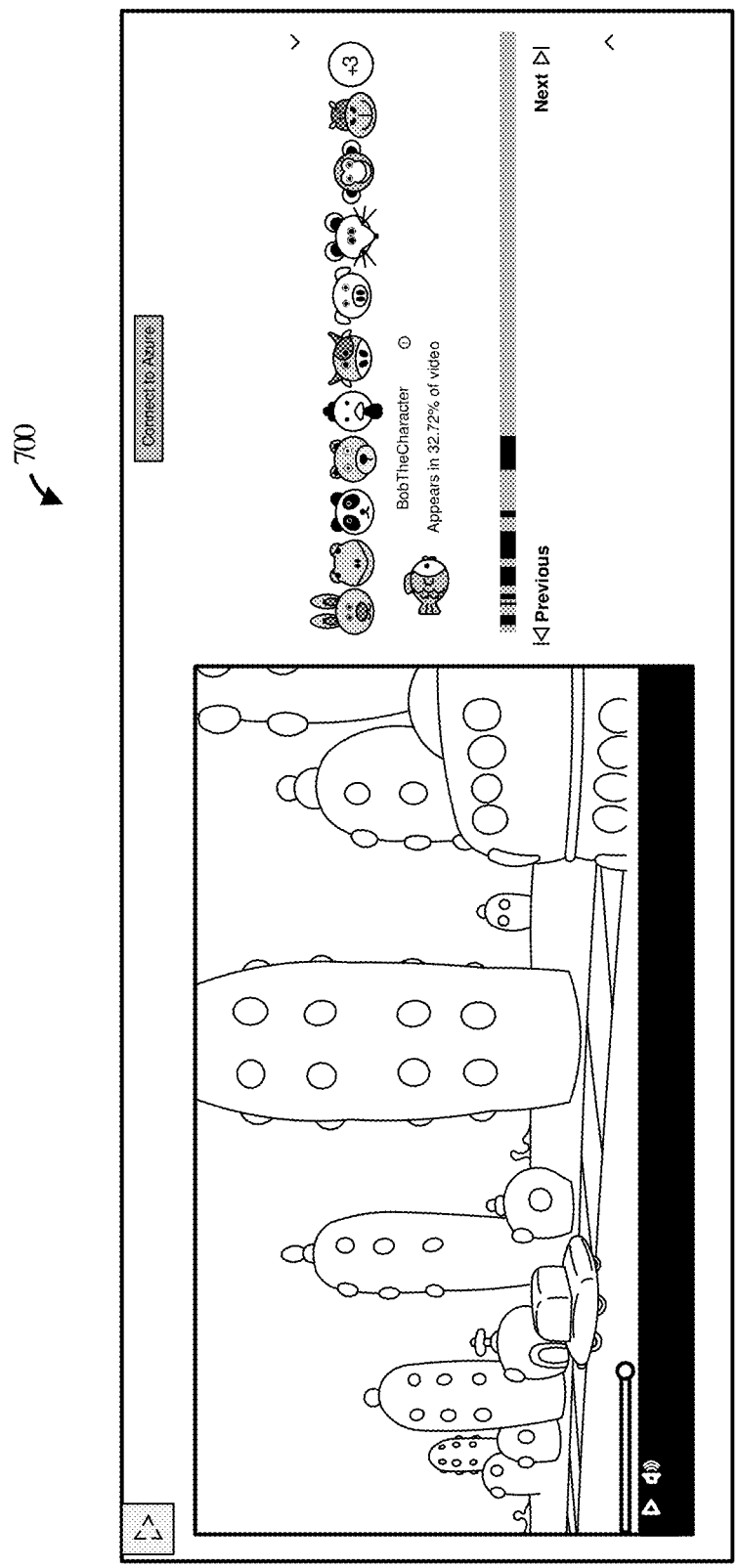
FIG. 7 depicts a graphical user interface illustrating an example video that has been indexed using a media indexer, according to some implementations.

FIGS. 6-8 depict various graphical user interfaces that can be presented to a user. Referring first to the example of FIG. 6, FIG. 6 depicts a graphical user interface including various menus for selecting various options for uploading a video file, according to some implementations. More specifically, FIG. 6 depicts a graphical user interface including various menus for selecting various options for uploading a video file and (optionally) selecting a trained AI-based image classification model with which to index the video file (or alternatively to train).

Referring next to the example of FIG. 7 which depicts a graphical user interface illustrating an example video that has been indexed using the media indexer discussed herein. Indeed, the example of FIG. 7 illustrates instances of various different characters that have been identified, classified and indexed in an example video.

Figure 9:
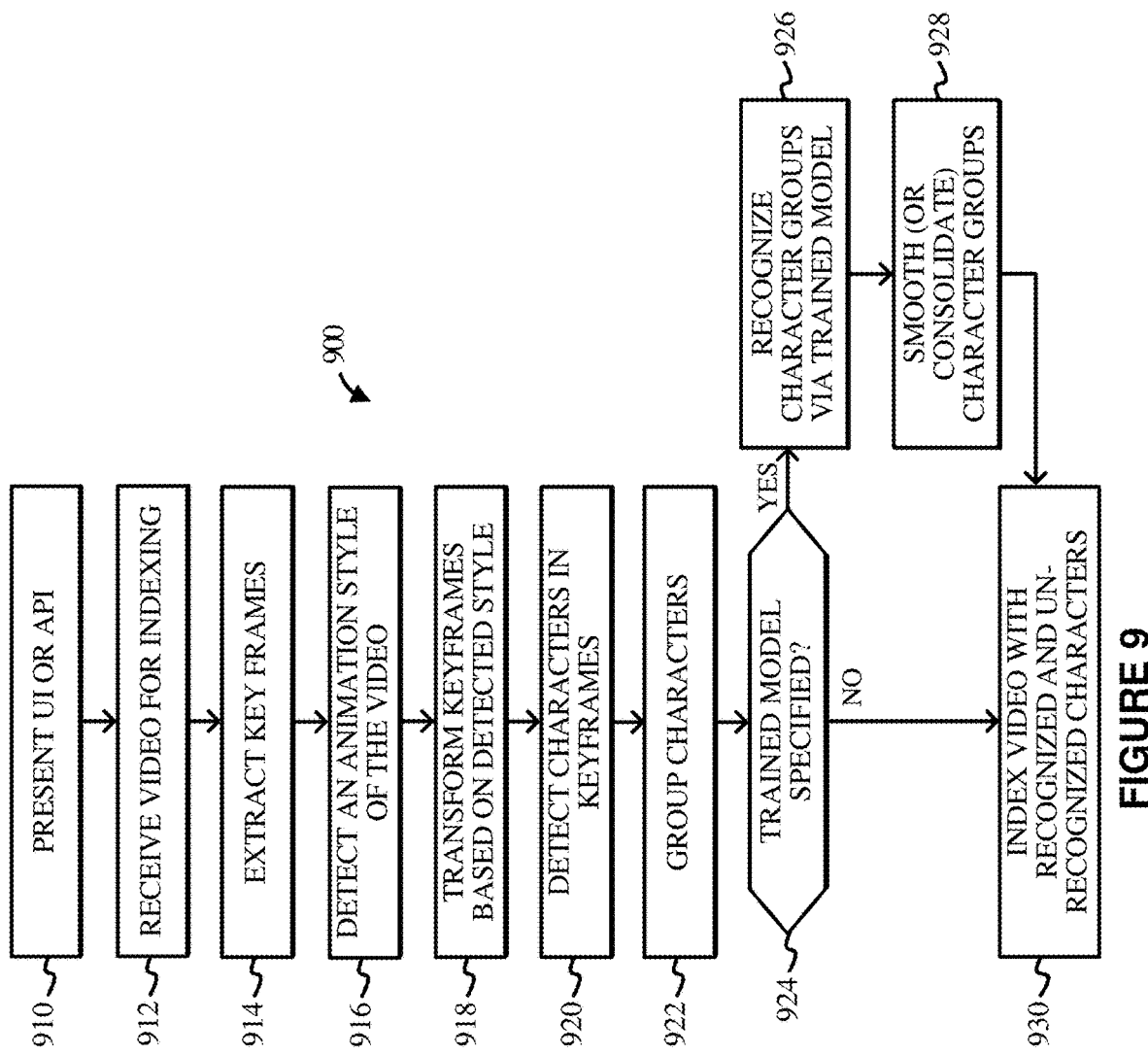
FIG. 9 depicts a flow diagram illustrating an example process for indexing a multi-frame animated media file using the automated character detection and grouping technique discussed herein, according to some implementations.

Similarly, FIG. 8 depicts a graphical user interface illustrating an example video that has been indexed using the media indexer discussed herein. More specifically, FIG. 9 depicts a flow diagram illustrating an example process 900 for indexing a multi-frame animated media file, e.g., animated video, using the automated character detection and grouping technique discussed herein, according to some implementations. The example process 900 may be performed in various implementations by a media indexer such as, for example, media indexer 120 of FIGS. 1A and 1B, or one or more processors, modules, engines, or components associated therewith.

The example process 900 is similar to example process 300 except that example process 900 includes steps for style adaptation. For example, an AI-based image classification model can be trained using a first type (or style) of animation, e.g., computer generated graphics (CGI) and subsequently applied to an input including as second type (or style) of animation, e.g., hand drawn animations, without retraining model. Among other potential options, the keyframes can be adjusted or transformed (as shown in the example of FIG. 9) or the extracted features can be transformed prior to embedding into the feature space (as shown in the example of FIG. 10).

Referring again to FIG. 9, in some implementations, an additional network for style adaptation can be added to the detector, e.g., character detection module 124, for online adaptation of unseen (or unknown) animation styles. The additional network can be trained offline in a variety of manners. For example, training data can be based on a labeled dataset that is used for training the detector and dataset of unseen movies (e.g. trailers). The style adaption network can learn to propagate local feature statistics from the dataset used for training to the unseen data. The training can be based on minimax optimization that maximizes the character detector confidence on the characters detected in the unseen images, while minimizing the distance of the deep learned embeddings of the images before and after style transfer (thus maintaining similar semantic information). The deep learned embeddings that can be used are the same that are used for featurizing and grouping.

Figure 10:
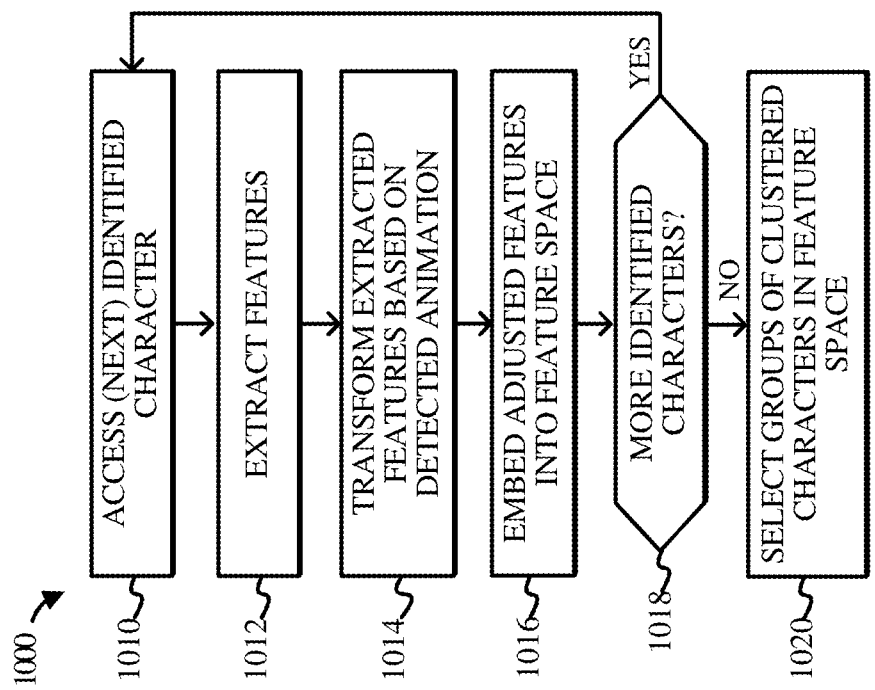
FIG. 10 depicts a flow diagram illustrating another example process for grouping (or clustering) characters that are automatically detected in a multi-frame animated media file, according to some implementations.

FIG. 10 depicts a flow diagram illustrating another example process 1000 for grouping (or clustering) characters that are automatically detected in a multi-frame animated media file, according to some implementations. The example process 1000 may be performed in various implementations by a media indexer such as, for example, media indexer 120 of FIGS. 1A and 1B, or one or more processors, modules, engines, or components associated therewith.

The example process 1000 is similar to example process 500 of FIG. 5 except that example process 1000 includes steps for style adaptation. Specifically, the example process 1000 can adapt or transform features as opposed to entire keyframes (as discussed in the example of FIG. 9).

Figure 11:
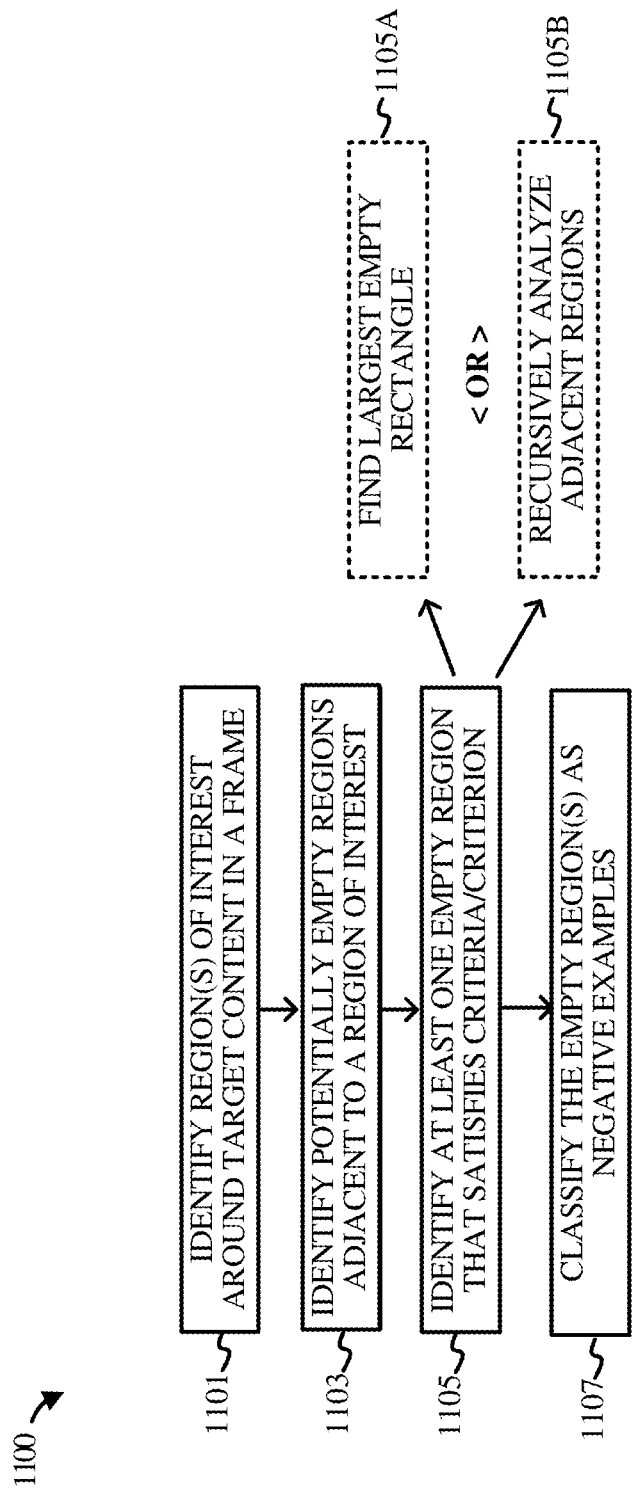
FIG. 11 depicts a flow diagram illustrating an example process for identifying and classifying negative examples of target content, according to some implementations.

FIG. 11 illustrates a process 1100 for sampling negative examples of images to be supplied as training data to an image classifier. Negative examples sampling for image classification provides for classification enhancement. Customizable image classification of any specific domain—for example, animated characters—is required to teach the machine learning model to tell the known classes from the rest of the world. Background sampling is a good way to generate bounding boxes that do not intersect with characters' bounding boxes. The technical problem is the computation complexity since the nature of the problem is a non-convex hard problem in the mathematical sense (NP complete). For instance, the number of possible background (BG) boxes grow exponentially with the number of regions of interests—bounding boxes.

Process 1100 begins with identifying regions of interest around target content in a frame (step 1101). The regions of interest may be formed by bounding boxes of rectangular shape drawn around content of interest in an image, series of images (video frames), or the like. Examples of such content include characters from animated videos, components in a layout (e.g. circuitry and components on an electrical board or furniture in an office layout).

Next, process 1100 identifies potentially empty regions adjacent to a region of interest (step 1103). The region of interest may be one of the regions of interest identified in the context of step 1101). Each of the potentially adjacent regions include one side that is adjacent to the central region of interest and have axis that are parallel to the axis of the central region of interest. In an example, the central region of interest may be a rectangle and the potentially empty regions are also rectangles aligned axially with the central rectangle and having one side that abuts a side of the central rectangle. Other shapes are possible such as triangles, squares, parallelograms, and trapezoids, and even rounded shapes that lack the straight edges of the aforementioned examples.

Process 1100 then proceeds to identify at least one empty region, from the potentially empty regions, that satisfies one or more criteria (step 1105). An empty region that satisfies the one or more criteria can be classified (or designated) as a negative example of the target content that is the subject of the image classifier (step 1107). The negative example can be grouped together with other negative examples in a set and supplied as training data to the classifier, along with positive examples of the target content.

Returning to step 1105, identifying empty regions may be accomplished in a variety of ways. In one example, process 1100 may find the empty region(s) by employing a largest empty rectangle algorithm (Step 1105A). A largest empty rectangle algorithm (or maximum empty rectangle) can quickly find the largest rectangular region in an image that is devoid of the target content. An empty rectangle would therefore avoid—or not overlap with—any other rectangle that includes target content.

Alternatively, process 1100 may employ a recursive analysis of the regions adjacent to a central region to find the empty regions (step 1105). Such a recursive analysis first identifies the regions adjacent to the central region and designates those that are empty (and optionally of a satisfactory size) as negative examples. The analysis then recursively does the same for any of the adjacent regions that are not empty. That is, the analysis identifies other regions that are adjacent to an adjacent region and examines those regions (or sub-regions) for those that are empty (and optionally of a satisfactory size).

Figure 12:
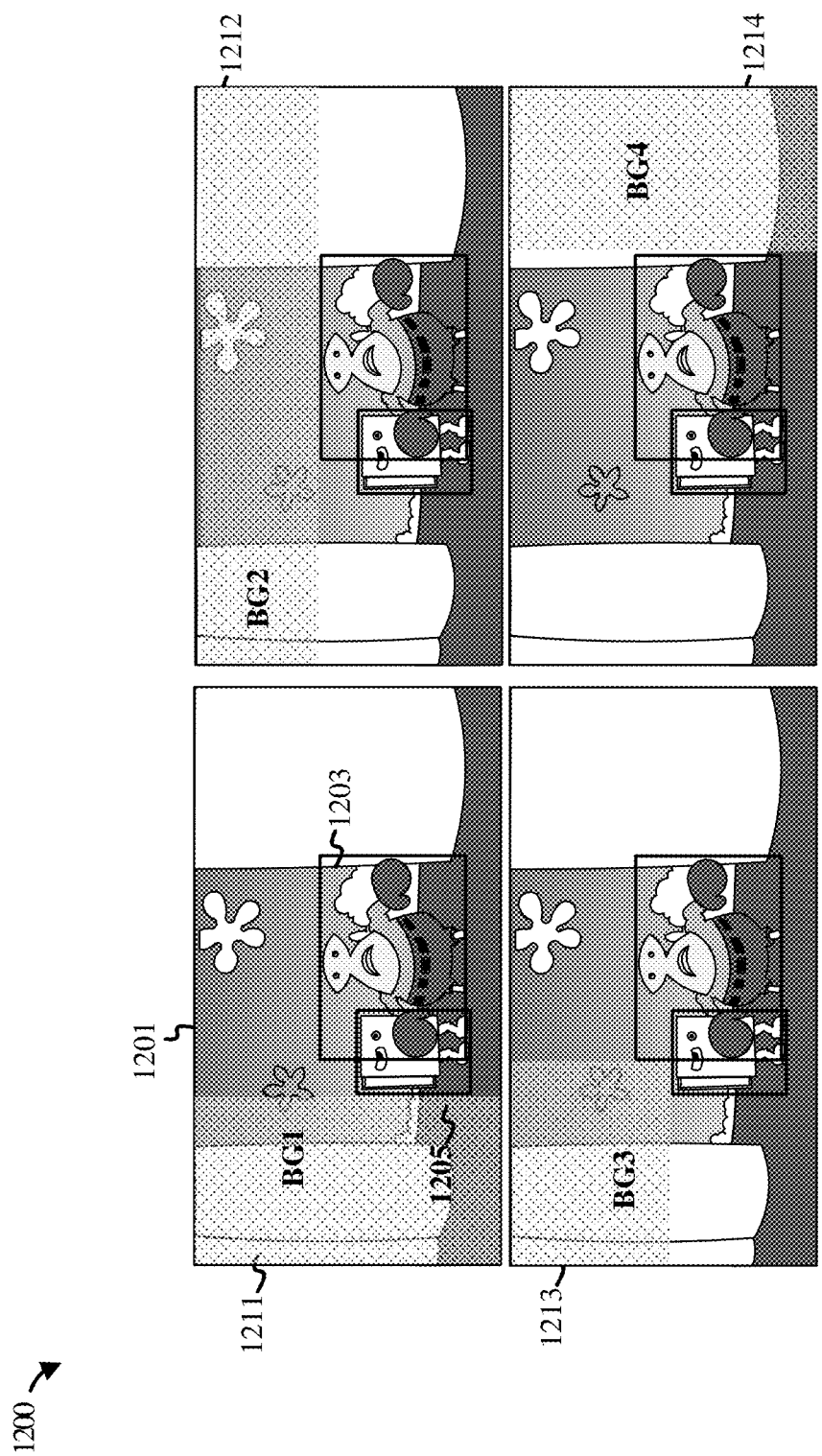
FIG. 12 depicts an exemplary scenario in which a negative sample of target content is identified, according to some implementations.

FIG. 12 illustrates the results produced by an implementation of process 1100 in an exemplary scenario 1200. In this scenario, process 1100 examples an 1201 that includes two rectangular bounding boxes represented by bounding box 1203 and bounding box 1205. Bounding box 1203 is drawn around one animated character, while bounding box 1205 is drawn around another.

As applied to image 1203, process 1100 utilizing a recursive analysis would identify four empty regions to adjacent to bounding box 1203 that qualify as negative examples of the target content represented by region 1211, region 1212, region 1213, and region 1214. Utilizing a largest rectangle approach, process 1100 would only identify a single rectangle, e.g. region 1214 because it is the largest of the four. Whether to use one approach over another would depend on operational constraints. For instance, a largest rectangle approach may be faster than a recursive analysis, but the resulting negative sample may inherently have less information encoded in it than the set of negative examples produced by a recursive approach. However, from a practical perspective, the speed gained by the largest rectangle approach may be considered a worthwhile tradeoff.

Figure 13:
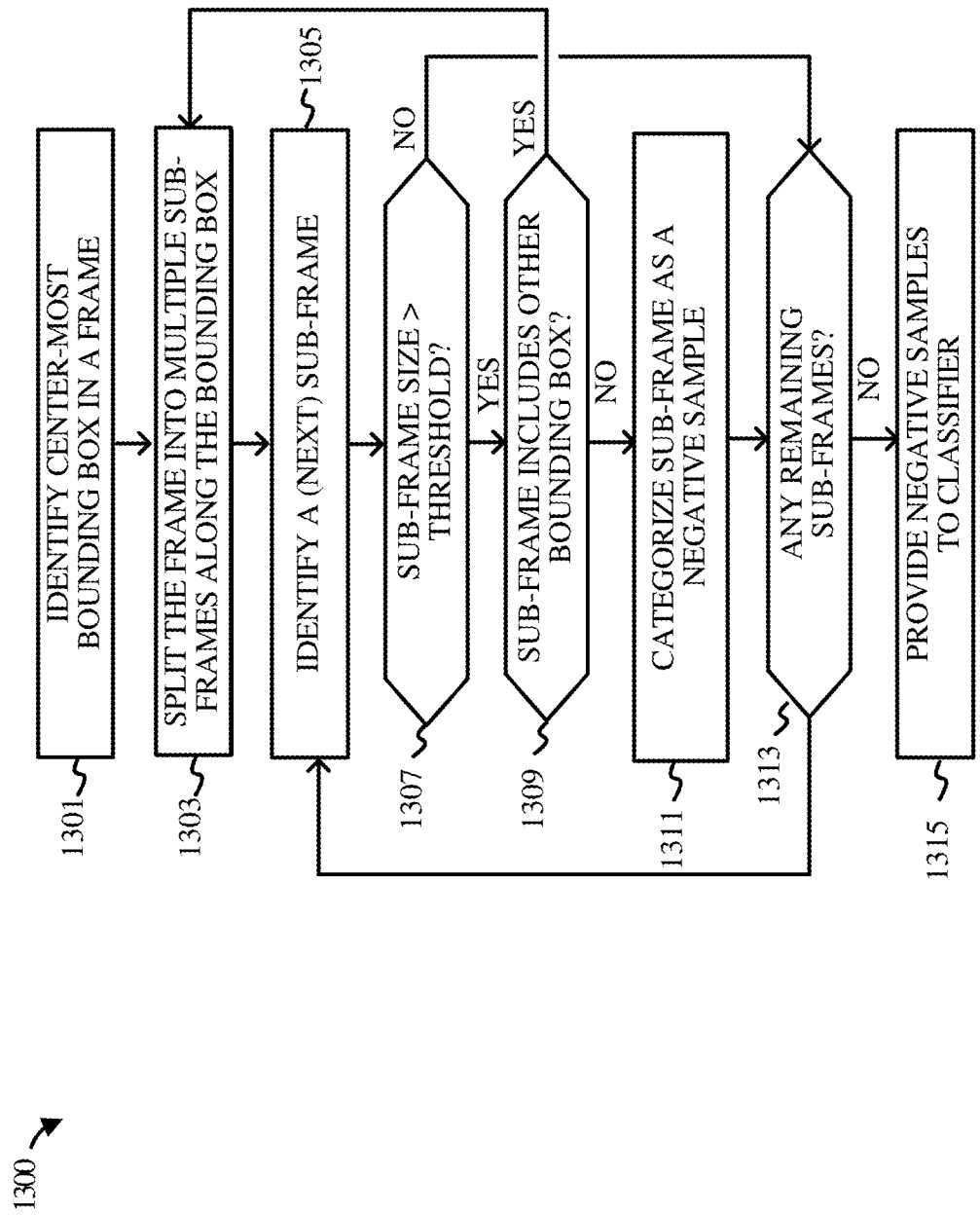
FIG. 13 depicts a flow diagram illustrating another example process for identifying and classifying negative samples of target content, according to some implementations.

FIG. 13 illustrates a recursive process 1300 for sampling negative examples of images to be supplied as training data to an image classifier. A quad-tree like branch and bound recursion is proposed by process 1300 that yields bounding boxes that are as large as possible under certain complexity constraints. The recursion takes the most centered bounding box and splits the frame four times, i.e. the subframe above, below, on the right and on the left. The stopping criteria is either no more bounding boxes or when the subframe is simply too small. This mechanism allows an indexer and classifier integration to optimize the generation of negative examples even when the image has many bounding boxes which makes the naïve approach effectively unsolvable.

Referring more particularly to FIG. 13, the process begins with identifying a bounding box in a frame (step 1301). In some examples, the very first box may be the center-most box in the frame. The frame presumably includes one or more bounding boxes around potential animated characters or other objects/regions of interest with respect to which negative examples are needed.

The process proceeds to split the frame into multiple sub-frames around the bounding box (step 1303). In one example, four sub-frames could be developed from each of the four sides (left, right, top, and bottom) of the bounding box. Each of the four sub-frames would extend from one side of the bounding box to the edges of the frame itself. In other examples, the bounding box in question may provide fewer than four sides against which to develop sub-frames.

At step 1305, the process identifies one of the sub-frames to analyze as potentially acceptable as a negative example and then compares its size to that of a size constraint (step 1307). If the size of the sub-frame fails to meet a minimum size (e.g. is less than a threshold size), then the sub-frame is rejected as a potential negative sample. However, if the size of the sub-frame meets the minimum size, then the process determines whether the sub-frame includes or otherwise overlaps with one or more other bounding boxes (step 1309).

If no other bounding box is found within the sub-frame, then the sub-frame is considered a negative example and can be categorized or labeled as such (step 1311). If, however, the sub-frame includes one or more other bounding boxes within it, then the process returns to step 1303 to once again split the sub-frame into further sub-frames.

Assuming a sub-frame qualifies as a negative example, the process proceeds to determine if any sub-frames remain with respect to the parent frame to which the sub-frame belongs (step 1313). If so, then the process returns to step 1305 to identify and analyze the next sub-frame.

If no other sub-frames remain, then all the negative examples that were identified can be provided as training data to a classifier (step 1315). This step may be performed in batch mode, individually after each negative example is identified, or in some other manner.

Figure 14:
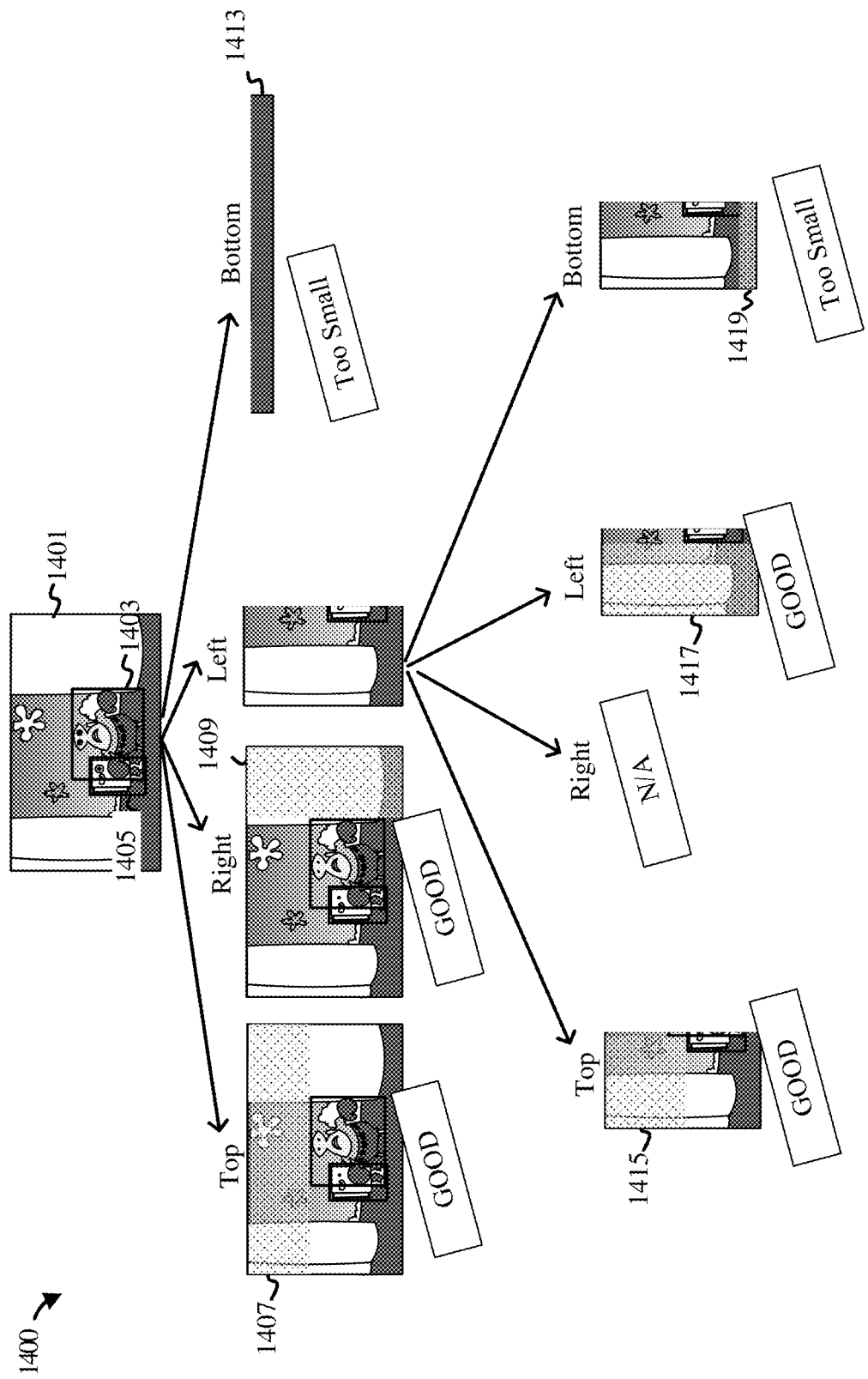
FIG. 14 depicts an exemplary scenario in which negative samples of target content are identified, according to some implementations.

FIG. 14 illustrates an example implementation of the negative example sampling process of FIG. 13. In FIG. 14, a frame includes two bounding boxes around two characters. The characters are referred to as "red" and "yellow" herein. The larger box 1403 is drawn around the red character, while the smaller box 1405 of the two is drawn around the yellow character.

As applied to the image in FIG. 14, the negative example sampling process of FIG. 13 first identifies the center-most bounding box, which is assumed for exemplary purposes to be the larger box around the red character. The frame around the bounding box is divided into four sub-frames to the right 1409, left 1411, top 1407, and bottom 1413 of the bounding box.

The top sub-frame is determined to satisfy the minimum size criteria and lacks any bounding boxes within it. The top sub-frame therefore qualifies as a negative example. The right sub-frame is also sufficiently large and lacks any other bounding boxes within it and therefore also qualifies as a negative example of the characters. The bottom sub-frame, however, is insufficiently large and therefore is rejected as a negative example candidate.

The left sub-frame, on the other hand, is sufficiently large but includes at least a portion of a bounding box within it—that of the smaller box surrounding the yellow character. The process therefore recursively operates on the portion of the yellow character's bounding box that falls within the left sub-frame of the parent frame.

Like the parent frame, the left sub-frame is split into multiple sub-frames, but only three in this case since the right side of the bounding box around the yellow character is excluded from the left sub-frame. The top sub-frame 1415 (of the child sub-frame) qualifies as a negative example because it is sufficiently large and has no other bounding boxes within it. The left sub-frame 1417 (of the child sub-frame) also qualifies as a negative example for the same reasons. However, no sub-frame to the right is possible and the bottom sub-frame 1419 fails for being too small.

Figure 15:
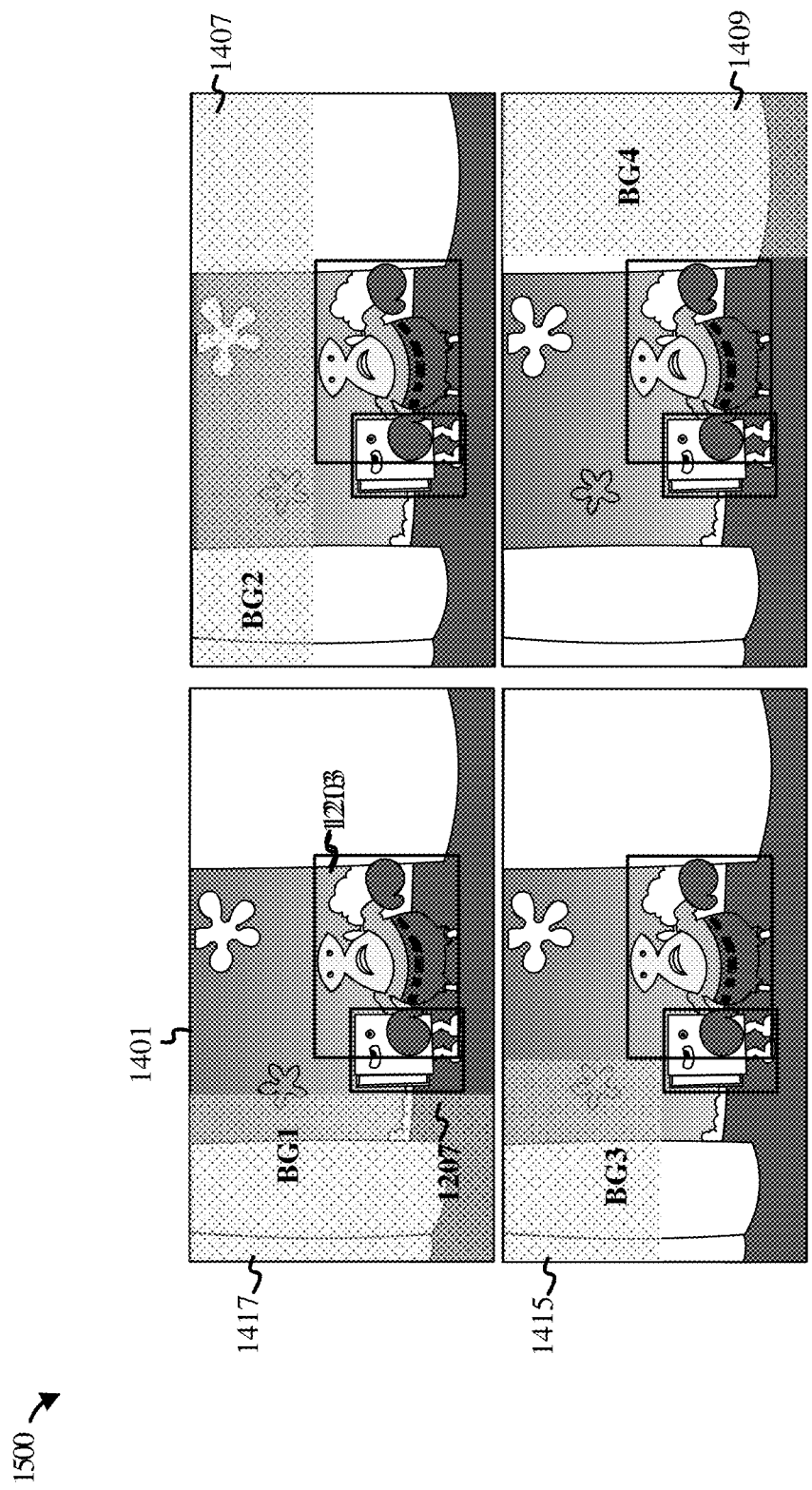
FIG. 15 depicts an exemplary scenario in which negative samples of target content are identified, according to some implementations.

As no other sub-frames exist at either the child level or the parent level of the image frame, all the negative examples have been identified and can be presented to an image classifier to enhance the training thereof. FIG. 15 illustrates an enlarged view 1500 of the final four negative examples that were produced by the application of the sampling process of FIG. 13 to the image of FIG. 14.

Figure 16:
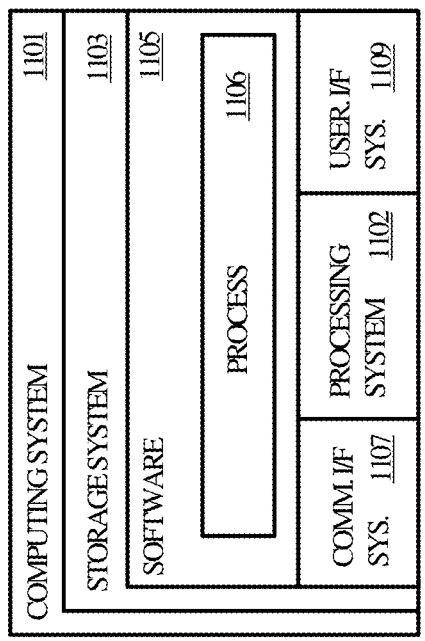
FIG. 16 depicts a block diagram illustrating an example computing system suitable for implementing the technology disclosed herein, including any of the applications, architectures, elements, processes, and operational scenarios and sequences illustrated in the Figures and discussed below in the Technical Disclosure.

FIG. 16 illustrates computing system 1601 that is representative of any system or collection of systems in which the various processes, programs, services, and scenarios disclosed herein may be implemented. Examples of computing system 1601 include, but are not limited to, server computers, cloud computing platforms, and data center equipment, as well as any other type of physical or virtual server machine, container, and any variation or combination thereof. Other examples include desktop computers, laptop computers, table computers, Internet of Things (IoT) devices, wearable devices, and any other physical or virtual combination or variation thereof.

Computing system 1601 may be implemented as a single apparatus, system, or device or may be implemented in a distributed manner as multiple apparatuses, systems, or devices. Computing system 1601 includes, but is not limited to, processing system 1602, storage system 1603, software 1605, communication interface system 1607, and user interface system 1609 (optional). Processing system 1602 is operatively coupled with storage system 1603, communication interface system 1607, and user interface system 1609.

Processing system 1602 loads and executes software 1605 from storage system 1603. Software 1605 includes and implements process 1606, which is representative of the processes discussed with respect to the preceding Figures. When executed by processing system 1602 to provide packet rerouting, software 1605 directs processing system 1602 to operate as described herein for at least the various processes, operational scenarios, and sequences discussed in the foregoing implementations. Computing system 1601 may optionally include additional devices, features, or functionality not discussed for purposes of brevity.

Continuing with the example of FIG. 16, processing system 1602 may comprise a micro-processor and other circuitry that retrieves and executes software 1605 from storage system 1603. Processing system 1602 may be implemented within a single processing device but may also be distributed across multiple processing devices or sub-systems that cooperate in executing program instructions. Examples of processing system 1602 include general purpose central processing units, graphical processing units, application specific processors, and logic devices, as well as any other type of processing device, combinations, or variations thereof.

Storage system 1603 may comprise any computer readable storage media readable by processing system 1602 and capable of storing software 1605. Storage system 1603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1603 may also include computer readable communication media over which at least some of software 1605 may be communicated internally or externally. Storage system 1603 may be implemented as a single storage device but may also be implemented across multiple storage devices or sub-systems co-located or distributed relative to each other. Storage system 1603 may comprise additional elements, such as a controller, capable of communicating with processing system 1602 or possibly other systems.

Software 1605 (including learning process 1606) may be implemented in program instructions and among other functions may, when executed by processing system 1602, direct processing system 1602 to operate as described with respect to the various operational scenarios, sequences, and processes illustrated herein. For example, software 1605 may include program instructions for implementing a reinforcement learning process to learn an optimum scheduling policy as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1605 may include additional processes, programs, or components, such as operating system software, virtualization software, or other application software. Software 1605 may also comprise firmware or some other form of machine-readable processing instructions executable by processing system 1602.

In general, software 1605 may, when loaded into processing system 1602 and executed, transform a suitable apparatus, system, or device (of which computing system 1601 is representative) overall from a general-purpose computing system into a special-purpose computing system customized to provide motion learning. Indeed, encoding software 1605 on storage system 1603 may transform the physical structure of storage system 1603. The specific transformation of the physical structure may depend on various factors in different implementations of this description. Examples of such factors may include, but are not limited to, the technology used to implement the storage media of storage system 1603 and whether the computer-storage media are characterized as primary or secondary storage, as well as other factors.

For example, if the computer readable storage media are implemented as semiconductor-based memory, software 1605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1607 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

Communication between computing system 1601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The phrases "in some embodiments," "according to some embodiments," "in the embodiment shown," "in other embodiments," "in some implementations," "according to some implementations," "in the implementation shown," "in other implementations," and the like generally mean the particular feature, structure, or characteristic following the phrase is included in at least one embodiment or implementation of the present technology and may be included in more than one embodiment or implementation. In addition, such phrases do not necessarily refer to the same or different embodiments or implementations.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method comprising:
    identifying a bounding box around a character in an image;
    identifying multiple sub-frames within a frame around the bounding box; and
    for at least a sub-frame of the sub-frames:
        determining whether the sub-frame satisfies a plurality of criteria, wherein the plurality of criteria comprises a size threshold and whether the sub-frame is empty;
        in response to determining that the sub-frame satisfies the plurality of criteria, designating the sub-frame a negative example of one or more characters in the image; and
        in response to determining that the sub-frame is empty but does not satisfy the size threshold, discarding the sub-frame without designating the sub-frame as a negative example.

2. The method of claim 1 wherein:
    the plurality of criteria comprises whether a size of the sub-frame meets or exceeds a size threshold and whether the sub-frame is empty; and
    the sub-frame satisfies the plurality of criteria if the size of the sub-frame meets or exceeds the threshold and if the sub-frame is empty.

3. The method of claim 2 further comprising, in response to determining that the sub-frame is not empty, identifying other sub-frames within the sub-frame and adjacent to a rectangular portion of the sub-frame that includes at least a portion of another bounding box around another character.

4. The method of claim 3 further comprising, in response to determining that the sub-frame is not empty:
    identifying at least one other sub-frame of the other sub-frames that satisfies the plurality of criteria; and
    classifying at least the one other sub-frame as the negative example of the one or more characters in the image.

5. The method of claim 4 further comprising:
    including the negative example in a set of negative examples of the one or more characters; and
    training a machine learning model to identify instances of the one or more characters based on training data comprising the set of negative examples and a set of positive examples of the one or more characters.

6. A method for indexing video comprising:
    identifying one or more regions of interest around target content in a frame of a video;
    identifying, in a portion of the frame outside a region of interest, potentially empty regions adjacent to the region of interest;
    identifying at least one empty region of the potentially empty regions that satisfies criteria, wherein the criteria comprise:
        whether an empty region qualifies as empty for not including any of the one or more regions of interest around the target content; and
        whether a size of the empty region meets a size threshold;
    classifying at least the one empty region that satisfies the criteria as a negative sample of the target content;
    identifying at least one empty region of the potentially empty regions that qualifies as empty but does not meet the size threshold; and discarding the empty region that qualifies as empty but does not meet the size threshold without classifying the empty region as any type of sample of the target content.

7. The method of claim 6 further comprising:
including the negative sample of the target content in a set of negative samples of the target content; and
training a machine learning model to identify instances of the target content based on training data comprising the set of negative samples.

8. The method of claim 6 wherein:
the target content comprises an animated character in the video; and
the region of interest comprises a bounding box around the animated character.

9. The method of claim 8 wherein the potentially empty regions adjacent to the region of interest comprise rectangles, each with one side adjacent to the bounding box.

10. The method of claim 9 wherein:
the rectangles comprise empty rectangles that do not overlap with any of the one of more regions of interest around the target content; and
identifying at least the one empty region that satisfies the criteria comprises identifying a largest one of the empty rectangles.

11. The method of claim 10, wherein discarding the empty region that qualifies as empty but does not meet the size threshold comprises discarding a rectangle that qualifies as empty but does not meet the size threshold without classifying the rectangle as any type of sample of the target content.

12. The method of claim 10 further comprising, for a rectangle that does not qualify as empty, identifying potentially empty rectangles adjacent to a rectangular portion of the rectangle that includes at least a portion of another bounding box around another animated character.

13. The method of claim 12 further comprising, for a rectangle that does not qualify as empty:
identifying at least one empty rectangle of the potentially empty rectangles that qualifies as empty and meets the size threshold; and
classifying at least the one empty rectangle as a negative sample of the target content.

14. The method of claim 6 wherein the target content comprises animated characters in the video.

15. The method of claim 14 wherein:
the one or more regions of interest comprise bounding boxes drawn around instances of the animated characters in the frame;
the portion of the frame outside the region of interest comprises a border area defined by a boundary of the region of interest and a boundary of the frame; and
the region of interest comprises a central most one of the bounding boxes.

16. A computing apparatus comprising:
one or more computer readable storage media;
one or more processors operatively coupled with the one or more computer readable storage media; and
program instructions stored on the one or more computer readable storage media that, when executed by the one or more processors, direct the computing apparatus to at least:
identify a bounding box around a character in an image;
identify multiple sub-frames within a frame around the bounding box; and
for at least a sub-frame of the sub-frames:
determine whether the sub-frame satisfies a plurality of criteria, wherein the plurality of criteria comprises a size threshold and whether the sub-frame is empty;
in response to determining that the sub-frame satisfies the plurality of criteria, designate the sub-frame a negative example of one or more characters in the image; and
in response to determining that the sub-frame is empty but does not satisfy the size threshold, discard the sub-frame without designating the sub-frame as a negative example.

17. The computing apparatus of claim 16 wherein:
the plurality of criteria comprises whether a size of the sub-frame meets or exceeds a size threshold and whether the sub-frame is empty; and
the sub-frame satisfies the plurality of criteria if the size of the sub-frame meets or exceeds the threshold and if the sub-frame is empty.

18. The computing apparatus of claim 17 wherein the program instructions, when executed by the one or more processors, further direct the computing apparatus to, in response to determining that the sub-frame is not empty, identify other sub-frames within the sub-frame and adjacent to a rectangular portion of the sub-frame that includes at least a portion of another bounding box around another animated character.

19. The computing apparatus of claim 18 wherein the program instructions, when executed by the one or more processors, further direct the computing apparatus to, in response to determining that the sub-frame is not empty:
identify at least one other sub-frame of the other sub-frames that satisfies the plurality of criteria; and
classify at least the one other sub-frame as the negative example of the one or more characters in the image.

20. The computing apparatus of claim 19 wherein the program instructions, when executed by the one or more processors, further direct the computing apparatus to:
include the negative example in a set of negative examples of the one or more characters; and
train a machine learning model to identify instances of the one or more characters based on training data comprising the set of negative examples and a set of positive examples of the one or more characters.

* * * * *